Feb. 28, 1956   J. J. A. BLAZAK   2,736,572
TORQUE STABILIZER FOR VEHICLE AXLES
Filed June 7, 1954
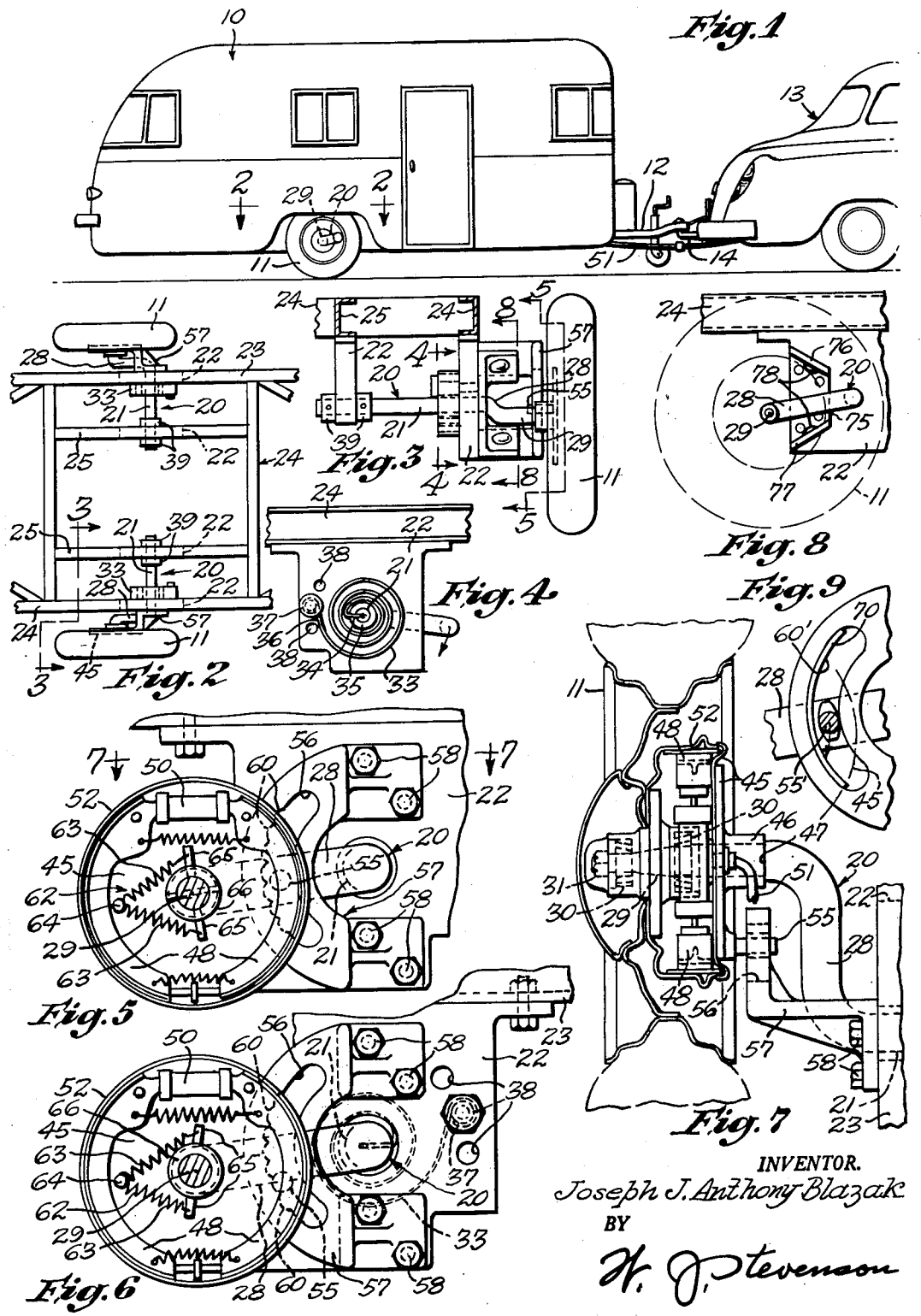
INVENTOR.
Joseph J. Anthony Blazak
BY
H. J. Stevenson

2,736,572
TORQUE STABILIZER FOR VEHICLE AXLES

Joseph J. Anthony Blazak, Sepulveda, Calif.

Application June 7, 1954, Serial No. 434,975

8 Claims. (Cl. 280—124)

This invention relates generally to wheel suspension means for vehicles, the application being a continuation-in-part of my pending application, Serial No. 420,515, filed April 2, 1954 and titled Spring Suspension and Axle for Vehicles.

Vehicles of the non-driving types, such as various forms of trailers towed behind motor vehicles, commonly have a transverse axle provided with spindles at its ends upon which the wheels are rotatable, such trailers being equipped with spring means by which the trailer body is supported from the axle. One such conventional axle and wheel suspension means in current use consists of a one-piece axle shaft extending entirely across the trailer, the end portions of the axle which project beyond the side members of the chassis having crank arms bent toward the rear of the trailer, the ends of the crank arms then projecting normal to the arms and substantially parallel to the axle shaft and providing spindles for rotatably mounting the wheels. The axle shaft is rotatable in spaced pillow blocks and at least one helical spring surrounds the shaft, one end of the spring being anchored to the shaft and the other end being adjustably attached to a fixed part of the vehicle chassis, such as one of the pillow blocks, the spring being operative to normally pivot the axle in a direction to lower its spindles and maintain the trailer body elevated.

Trailers of the larger, heavy types, such as house trailers, are equipped with brakes by which the wheels can be brought promptly to a stop when the towing vehicle is stopped, this being necessary to assure full driving control by avoiding "jack-knifing" of the tandem. When a conventional, V-shaped axle of the type referred to above is equipped with such brakes, the brake flange or backing plate of each brake is secured fast to a wheel spindle of the axle and, in accordance with conventional practice, carries the movable brake shoes, hydraulic cylinder, etc. The brake drum is carried by the wheel in the usual manner.

In such a wheel suspension and brake arrangement, when the trailer is traveling along the highway each wheel rotates on one of the axle spindles relative to the contracted brake shoes and when hydraulic fluid is introduced into the cylinder of this wheel and the brake shoes are extended into engagement with the drum, the spindle, backing plate, brake shoes, drum and wheel are, in effect, frictionally locked together as a unit. At the instant of braking, the rotating wheel creates and transmits to the wheel spindle torque of considerable magnitude, depending upon the traveling speed of the trailer as the brake is applied. This torque results in pivoting the crank arm of the axle in a manner such that the axle spindle is forced upwardly and the pivotal shaft of the axle is lowered. Such pivoting movement of the crank, which is now a torque arm, results in lowering the transverse shaft of the axle to the extent that the trailer body is caused to lower or dip suddenly. Since the applied torque is practically unresisted, it follows that the extent of such violent downward force applied to the trailer body is considerable.

Such pivotal movement of the torque arm results in winding up the axle springs.

When the trailer comes to a full stop and the torque energy is thus fully expended, the axle springs which were tensioned during the application of torque, now tend to unwind and stabilize themselves in their normal condition. However, the sudden unleashing of spring power, acting through the crank or lever arm, creates an upward thrust on the trailer which may force the trailer body considerably above its normal riding level. Several upward and downward movements of the trailer may take place before the springs assume their normal tensioned condition and the trailer body becomes stabilized. Consequently, the trailer is caused to oscillate and this action not only shakes the trailer body and its contents but imposes undesirable strain on the trailer hitch and causes similar oscillation of the towing vehicle to impair the riding qualities and maneuverability thereof.

In my prior application, referred to above, there is disclosed an axle structure in which the wheels of a trailer are individually suspended, this desirable condition being effected through the use of a pair of separate, Z-shaped axles. These axles are similar to the conventional pivoted and spring-actuated axle referred to above with the important exception that they are mounted for pivotal movement independently of each other. By this individual suspension means, the wheels of the vehicle may move vertically relative to each other in accordance with the road conditions so that the trailer body is maintained substantially stabilized on a more or less even keel. While such a two-part axle structure is an important improvement over the axle of one-piece construction, it is subject to the same disadvantage of creating an oscillation or rebounding of the trailer body when the brakes are applied and subsequently released.

It is an object of the present invention to obviate the disadvantages and deficiencies of pivotal, crank-arm type wheel suspension axles by providing a so-called torque stabilizer device which functions to counteract or absorb the torque created when the brakes at each wheel are applied, the device thus preventing the transmission of the torque forces to the crank arm of the axle which, if allowed to occur, would result in undesirable vertical movement of the trailer body.

Another object of the invention is to provide a torque stabilizing wheel suspension means in which the brake flange or backing plate is mounted for limited rotation on the axle spindle but carries the brake shoes and associated parts as in conventional wheel structures.

Another object of the invention is to provide a device, of the character referred to, in which rotation of the brake flange on the wheel spindle is checked by means of a pin or similar projection on the brake flange which is engageable against an arcuate braking or locking surface arranged concentric with the pivotal axis or shaft of the wheel axle. In accordance with the invention, the pin normally is disengaged from the arcuate surface, during rotation of the wheel, and thus may travel upwardly and downwardly adjacent the arcuate surface to allow pivotal movement of the axle as the trailer travels along the ground. However, when the wheel brake is applied and torque is created tending to rotate the brake flange, this initial torque rotates the brake flange slightly to cause its locking or stabilizing pin to immediately engage the fixed arcuate locking surface so as to prevent further rotation of the flange and thus effecting full braking action. Since the brake flange is freely rotatable on the axle spindle, torque developed by the wheel is not transmitted to the crank arm of the axle so that the axle and trailer body supported thereby remain stabilized.

Another object of the invention is to provide a device of the class specified in which the braking or locking surface is formed as a side of an arcuate slot or opening provided in a heavy casting fixedly secured to the trailer chassis. A related object is to provide means on the arcuate locking surface for insuring a positive gripping or dogging of the braking pin thereagainst, this means consisting either of a series of undulations providing recesses in which the pin is engageable or a friction lining applied against the surface.

Another object of the invention is to provide an axle structure of the type indicated embodying fixed stop means against which the crank arm of the axle is engageable to limit the upward and downward pivotal movement of the axle.

A further object of the invention is to provide a torque stabilizer for a wheel suspension means which is relatively simple in construction and easy to install, one which is adapted for use in connection with either an axle carrying both wheels of the trailer or one providing individual suspension for each wheel, and one which may be installed on a large variety of vehicles without requiring extensive alteration of the vehicle structure.

Further objects will appear from the following description and from the drawing, which is intended for the purpose of illustration only, and in which:

Fig. 1 is a side elevation of a house trailer which is towed behind a motor car, the trailer having its wheels individually suspended by separate axles equipped with the present torque stabilizer device;

Fig. 2 is a sectional plan view, taken on line 2—2 of Fig. 1;

Fig. 3 is a transverse sectional view, taken on line 3—3 of Fig. 2;

Fig. 4 is a vertical sectional view, taken on line 4—4 of Fig. 3;

Fig. 5 is an enlarged sectional view, taken on line 5—5 of Fig. 3, showing the position assumed by the torque stabilizer elements when the wheel brake is disengaged;

Fig. 6 is a view similar to Fig. 5, showing the relation of the torque stabilizer elements when the wheel brake is applied;

Fig. 7 is a sectional plan view, taken on line 7—7 of Fig. 5;

Fig. 8 is a vertical sectional view, taken on line 8—8 of Fig. 3; and

Fig. 9 is a face view of the torque stabilizer means, showing an alternative construction.

Referring to Figs. 1 to 8 in detail, the present torque stabilizer device is shown as applied to use on a house trailer 10 having wheels 11 and a yoke 12 at its front end by which the trailer is connected to be towed from a motor car 13 by means of a trailer hitch 14.

As shown best in Figs. 2 and 3, each of the two wheels 11 of the trailer 10 is rotatably carried by a separate axle 20 of the type disclosed in my pending application referred to above. Suffice it to state herein that each axle 20 includes a shaft portion 21 which is rotatable in transversely-spaced pillow block bearings 22 secured to one of the side members 23 of the trailer chassis 24 and to a longitudinal member 25 of the chassis. Each axle 20 has an arm 28 bent normal to its shaft 21, said arm terminating in a right-angularly bent spindle 29 upon which a wheel 11 is rotatable by means of roller bearings 30 and held in place by a nut 31 (Fig. 7).

The crank arm 28 of each axle extends toward the rear end of the trailer and the axle normally is rotated in a direction which maintains the wheel firmly against the ground. The means for so pivoting the axle consists of spring means engageable between the axle and a fixed part of the trailer chassis. In the present drawings, this spring means is shown in Fig. 4 as consisting of a volute- or clock-spring 33 having the bent end 34 of its inner convolution engageable in a slot formed in the axle shaft 21, this end also passing through a slot in a sleeve 35 slid onto the shaft and fixed thereto by a set-screw or other means. By employing such a sleeve, the shaft is, in effect, enlarged to accommodate the inner convolution which is considerably larger than the shaft. The end 36 of the outer convolution of the spring 33 has a loop through which an anchoring bolt 37 extends, the bolt being insertable in any of a series of holes 38 in the outer pillow block 22. By inserting the bolt in selected holes 38, the tension of the spring 33 may be adjusted in accordance with the load of the trailer to maintain the crank arm 28 substantially horizontal or slightly below the horizontal as shown in Fig. 5. Collars 39 on the shaft 21 serve to retain the shaft 21 axially in place.

Trailers of the larger, heavier types, for example house trailers, are usually provided with brake means by which the trailer wheels are stopped simultaneously with the stopping of the towing vehicle. Such conventional trailer brakes include a brake flange or backing plate secured fast to the wheel spindle and carrying the brake shoes, a hydraulic actuating cylinder and associated elements for engaging the brake shoes with the brake drum carried by the wheel and surrounding the brake shoes. As previously explained, when the brake flange is mounted fast on the spindle considerable torque is created when the wheel is frictionally locked to the brake flange and spindle by the brake shoes, and this torque is communicated to the crank arm of the axle so that the arm is pivoted in a direction to cause sudden lowering of the trailer body and subsequent rapid lifting of the trailer body when the trailer is brought to a stop and the torque is expended.

In the present improved wheel suspension means, the brake flange or backing plate 45 has a hub 46 which is rotatably mounted on the wheel spindle 29, the hub being held against a shoulder 47 by the wheel assembly. Conventional brake shoes 48 are mounted on the outer face of the brake flange and are operated by a hydraulic actuating cylinder 50 in the usual manner. The cylinder 50 is connected to the hydraulic system of the towing vehicle 13 by means of a disconnectible line 51 (Fig. 1). The brake shoes 48 are expandable into frictional engagement with a brake drum 52 carried by the wheel 11.

The brake flange 45 carries a relatively large pin 55 which projects from its inner face. This pin extends through an arcuate slot 56 formed in a heavy bracket-like casting 57 secured against the outer face of the outer pillow block 22 by bolts 58. It is to be noted from Fig. 5 that the slot 56 is arranged concentric with the axis of the axle shaft 21. The portion of the bracket 57 in which the slot 56 is located is offset outwardly (Fig. 7) to provide clearance for the crank arm 28. In the embodiment of the invention shown in Fig. 5, the arcuate side of the slot 56 disposed nearest the spindle 29 is undulated to provide a plurality of locking recesses 60.

The pin 55 normally is held in position on a radial line which coincides with that of the crank arm 28, as shown in Fig. 5, by spring means indicated at 62. This means may be of various forms, such as a pair of tension springs 63 each anchored at 64 to the brake flange 45 and to pins 66 carried by a collar 66 fast on the spindle 29 and arranged at diametrically opposite sides of the spindle.

Assuming that the trailer 10 is being towed along a roadway with its wheels 11 rotating on the spindles 29, the parts of the individual wheel suspensions and torque stabilizers may be positioned substantially as illustrated in Fig. 5. During travel of the trailer along the road, the clock springs 33 act to normally pivot the axles 20 in a direction to maintain the wheels carried thereby in firm rolling engagement against the roadway, these springs being so tensioned that they react against the downward load of the trailer body to maintain the latter elevated to the proper height. As the trailer travels along uneven ground, the springs 33 yield to allow vertical movement of the wheels 11 relative to the trailer chassis. Thus, as explained in detail in my pending application, the wheels are individually suspended and forces applied to each wheel and its axle, due to road conditions, is not communicated to the other axle and wheel and the trailer remains in a substantially stable condition.

When it is desired to slow or stop the towing vehicle 13 and trailer 10, the operator of the car applies the hydraulic brakes in the usual manner. Fluid pressure within the cylinders 50 of each wheel 11 engages the brake shoes with the drums 62 to frictionally stop the rotation of the wheels. Since both wheels of the trailer are controlled by like means, the mode of operation of the torque stabilizer as relating to the right-hand wheel 11, shown in Figs. 3, 5, 6 and 7, will be outlined.

When the trailer is traveling along the highway, the brake drum 52 of the wheel merely rotates about the brake shoes 48 and brake flange or backing plate 45 and the spring means 62 serves to maintain the brake flange 45, which is rotatable on the spindle 29, in the position shown in Fig. 5, that is, with its locking pin 55 substantially on the radial line of the crank arm 28.

When the brake shoes 48 are expanded into engagement with the drum 52 to stop the wheel, considerable torque is developed by the wheel and this is transmitted to the brake flange 45. Since this flange is loose on the spindle 29, it is apparent that the flange will be turned by and in the direction of rotation of the wheel, that is, clockwise as viewed in Figs. 5 and 6. Such action causes the locking pin 55 to move in a clockwise orbit and such movement is very slight for the reason that the pin immediately engages the arcuate, undulated braking surface of the slot 56 where it enters one of the locking recesses 60 thereof as shown in Fig. 6.

Consequently, further rotation of the pin 55 and the brake flange 45 is checked and, since the brake shoes 48 are now also held against such turning, a positive braking action is effected which promptly brings the wheel to a stop. It is to be observed that with the pin 55 locked against the arcuate surface 60 of the slot 56, torque applied by the wheel 11 to the brake flange 45 is positively resisted so that the braking action takes place between the shoes 48 and drum 52.

It is also important to note at this point that since the brake flange 45 is rotatable on the spindle 29, instead of fast thereon as is the case in conventional crank-arm axles, no torque can be transmitted through the flange to the crank arm 28 of the axle 20. For this reason, the axle and the trailer body supported thereby are stabilized during application of the brake means and the occurrence of sudden downward and upward thrusts imposed on the trailer body, which occur in pivoted, spring-actuated axles where the brake flange is secured fast on the wheel spindle, is entirely avoided. With the trailer thus stabilized, the trailer hitch and the towing vehicle are not subjected to undue strains and shocks so that greater stability and driving control of the vehicle is assured.

It is to be noted that after the trailer has been brought to a stop and the brakes 48 are released, the centering springs 63 function to restore the brake flange to its original position wherein the pin 55 is located as shown in Fig. 5. Since the pin 55 normally is unlocked from the slot 56, it is free to travel upwardly and downwardly in the slot to allow proper functioning of the wheel axle which must, of course, be free to pivot so as to maintain the wheel 11 against uneven roadways.

Referring to Fig. 9, in lieu of the grooves 60 in the slot 56, I may apply a strip of friction material 70 to the arcuate surface 60' and the pin 55' may be of elongate shape to effect greater frictional area for engaging the strip.

Preferably, stop means are provided for limiting the upward and downward pivotal movement of the axle 20. This means, as shown in Fig. 8, may consist of a bracket 75 secured to the outer pillow block 22 or other stationary element of the trailer, the bracket having upper and lower laterally projecting fingers 76 and 77 carrying resilient bumpers 78 adapted to be engaged by the crank arm 28 to limit the movement thereof in either direction.

While the torque stabilizer has been described above as applied to use in connection with a particular axle, it will be apparent that it is adapted for use with a conventional front wheel spindle of a motor vehicle or the rear, driven axle of the vehicle. In the case of the installation on the non-rotatable spindle, the brake flange is rotatably mounted on the fixed spindle and is equipped with a pin or the like engageable against an abutment fixed to the vehicle chassis, so as to retain the brake flange against rotation so as to apply the brakes and to retain the chassis against violent upward movement due to torque developed when the wheel brakes are applied. In the case of application of the torque stabilizer to the rear axle, the brake flange is rotatably mounted on the axle housing and has a pin or the like engageable against an abutment, fixed to the chassis, when the brakes are applied.

In accordance with the provisions of the patent statutes, I have described the principle of the invention, together with several structures which I now consider to represent the best embodiments thereof. I wish to have it understood, however, that various other modifications might be made in the structure without departing from the spirit or scope of the invention as defined in the appended claims.

I claim as my invention:

1. A torque stabilizer device for use in connection with a vehicle wheel suspension including an axle having a shaft extending transversely of the vehicle chassis, a crank arm integral with and extending normal to the shaft, and a wheel spindle integral with the crank arm and extending substantially parallel to said shaft, said axle being pivotally connectible to the vehicle body with the crank arm extending rearwardly of the vehicle to adapt the spindle and wheel rotatable thereon for vertical movement, and spring means engageable between the shaft and the vehicle chassis and normally operative to pivot the axle in a direction to maintain the wheel in firm rolling engagement against the ground, comprising: a brake flange rotatable on the axle spindle; brake means carried by the flange and frictionally engageable with the wheel; and locking means, responsive to torque developed by the braked wheel and transmitted to said brake flange through said brake means, for checking rotation of the flange on said wheel spindle so as to effect stopping of the wheel, said locking means including a stationary element securable to the vehicle chassis and providing a locking surface, and a projection on said brake flange normally located adjacent but free from said surface, rotation of said brake flange under the effect of torque transmitted thereto by the wheel through said brake means engaging said projection against locking surface.

2. A torque stabilizer device for use in connection with a vehicle wheel suspension including an axle having a shaft extending transversely of the vehicle chassis, a crank arm integral with and extending normal to the shaft, and a wheel spindle integral with the crank arm and extending substantially parallel to said shaft, said axle being pivotally connectible to the vehicle body with the crank arm extending rearwardly of the vehicle to adapt the spindle and wheel rotatable thereon for vertical movement, and spring means engageable between the shaft and the vehicle chassis and normally operative to pivot the axle in a direction to maintain the wheel in firm rolling engagement against the ground, comprising: a brake flange rotatable on the axle spindle; brake means carried by the flange and frictionally engageable with the wheel; and locking means, responsive to torque developed by the braked wheel and transmitted to said brake flange through said brake means, for checking rotation of the flange on said wheel spindle so as to effect stopping of the wheel, said locking means including a stationary element securable to the vehicle chassis and providing a curved locking surface, and a projection on said brake flange normally located adjacent but free from said surface, rotation of said brake flange under the effect of torque transmitted thereto by the wheel through said brake means engaging said projection against locking surface.

3. A torque stabilizer device for use in connection with a vehicle wheel suspension including an axle having a shaft extending transversely of the vehicle chassis, a crank arm integral with and extending normal to the shaft, and a wheel spindle integral with the crank arm and extending substantially parallel to said shaft, said axle being pivotally connectible to the vehicle body with the crank arm extending rearwardly of the vehicle to adapt the spindle and wheel rotatable thereon for vertical movement, and spring means engageable between the shaft and the vehicle chassis and normally operative to pivot the axle in a direction to maintain the wheel in firm rolling engagement against the ground, comprising: a brake flange rotatable on the axle spindle; brake means carried by the flange and frictionally engageable with the wheel; and locking means, responsive to torque developed by the braked wheel and transmitted to said brake flange through said brake means, for checking rotation of the flange on said wheel spindle as to effect stopping of the wheel, said locking means including a stationary element securable to the vehicle chassis and providing a curved locking surface concentric with the axis of the axle shaft, and a projection on said brake flange normally located adjacent but free from said surface, rotation of said brake flange under the effect of torque transmitted thereto by the wheel through said brake means engaging said projection against locking surface.

4. A device as defined in claim 3 in which said stationary element consists of a bracket having an arcuate slot in which said projection is disposed, said slot being of greater width than the thickness of the projection, the side of the slot nearest said spindle constituting said curved locking surface.

5. A device as defined in claim 4 in which said side of the slot is undulated, providing a plurality of grooves in which said projection is engageable.

6. A device as defined in claim 4 in which said side of the slot is provided with a lining of friction material.

7. A torque stabilizer device for use in connection with a vehicle wheel suspension including an axle having a shaft extending transversely of the vehicle chassis, a crank arm integral with and extending normal to the shaft, and a wheel spindle integral with the crank arm and extending substantially parallel to said shaft, said axle being pivotally connectible to the vehicle body with the crank arm extending rearwardly of the vehicle to adapt the spindle and wheel rotatable thereon for vertical movement, and spring means engageable between the shaft and the vehicle chassis and normally operative to pivot the axle in a direction to maintain the wheel in firm rolling engagement against the ground, comprising: a brake flange rotatable on the axle spindle; brake means carried by the flange and frictionally engageable with the wheel; and locking means, responsive to torque developed by the braked wheel and transmitted to said brake flange through said brake means, for checking rotation of the flange on said wheel spindle so as to effect stopping of the wheel, said locking means including a stationary element securable to the vehicle chassis and providing a curved locking surface concentric with the axis of the axle shaft, and a projection on said brake flange normally located adjacent but free from said surface, rotation of said brake flange under the effect of torque transmitted thereto by the wheel through said brake means engaging said projection against locking surface; and centering spring means normally operative to locate said projection in said slot substantially on a line coinciding with the axis of said crank arm, said spring means being yieldable to allow arcuate movement of said brake flange and engagement of its said projection against said curved surface.

8. An axle braking means for use in connection with a vehicle having a chassis and an axle having a shaft adapted for rotation on an axis to extend transversely of the vehicle chassis, a crank arm integral with the shaft and extending normal thereto, a wheel spindle integral with the crank arm and extending substantially parallel to the shaft, and a wheel for rotation on said spindle, said wheel having a brake drum, comprising: a brake flange rotatable on said spindle; brake shoes on said flange engageable with the drum; an element adapted for stationary mounting on said chassis and having a curved locking surface arranged concentric with the axis of said axle shaft; and a projection on said flange engageable against said locking surface for limiting rotation of the flange on said spindle.

References Cited in the file of this patent

UNITED STATES PATENTS

| 2,395,072 | Sauer | Feb. 19, 1946 |
| 2,701,727 | Linn | Feb. 8, 1955 |

FOREIGN PATENTS

| 629,425 | Germany | Apr. 30, 1936 |